Nov. 18, 1952 K. R. HOYT 2,618,759

VIEWING SCREEN FOR COLOR TELEVISION RECEIVERS

Filed Jan. 15, 1952

INVENTOR.
Karl Robert Hoyt
BY
Stedman B Hoar
Agent

Patented Nov. 18, 1952 2,618,759

UNITED STATES PATENT OFFICE 2,618,759

VIEWING SCREEN FOR COLOR TELEVISION RECEIVERS

Karl Robert Hoyt, Santa Ana, Calif., assignor of twelve and one-half per cent to Walter Mellott, twelve and one-half per cent to Otto Culbertson, twelve and one-half per cent to James S. Barrett, twelve and one-half per cent to Thomas B. Frost, all of Orange County, Calif.

Application January 15, 1952, Serial No. 266,551

10 Claims. (Cl. 313—92)

This invention relates to apparatus for coloring video images at the receiver, and more particularly relates to a new form of television viewing screen for a receiver tube or kinescope.

Reference is made to my copending application, Serial No. 251,274, filed October 15, 1951, in which I have disclosed means for obtaining with a single beam tube numerous advantages hitherto considered to require a plurality of electron beams, by use of which means an ordinary receiver tube, such as is commonly used for achromatic television reception, may be converted to reproduce color information transmitted in the video signals.

In the placement of the color filter described in my aforesaid application, in relation to the tube face-plate or viewing window, it is desirable to avoid having too great a distance between the phosphorus screen upon which the television image is made to appear, and the color filter, in order to avoid parallax and to permit the picture to be viewed from the widest possible vertical angle. At the same time, consideration must be given to the heat generated by the electron beam and to the necessity of forming a vacuum-tight face plate and envelope assembly.

It may be noted here that in recent developments of the art of television, there has been a tendency to increase the thickness of viewing windows and to utilize the viewing of window as a viewing screen, the increased thickness serving both to withstand atmospheric pressure on enlarged windows and to provide a larger area of contact with the tube envelope through which heat may be conducted and dissipated and a vacuum seal may be effected.

It is accordingly an object of my present invention to provide a viewing screen for a television receiver, in which a color filter is disposed in close proximity to the plane upon which the luminescent raster occurs, and yet in which the filter is protected from the heat and other effects of the electron beam.

Another object of this invention is to provide a viewing screen having an internally disposed color filter and adapted to be joined to the envelope of a receiver tube in a vacuum-tight joint.

Still another object of the invention is to provide a color filter and mounting therefore, which is adapted for use as a viewing screen, either internally in a television receiver tube, or as the tube face plate or window.

A further object of this invention is to provide a face-plate and incorporated color-filter of simple and low-cost construction.

The invention possesses further advantages and purposes which will become apparent or be specifically pointed out as the following description of preferred and modified embodiments of the invention proceeds, these embodiments being described by way of example and being illustrated in the accompanying drawing, in which Fig. 1 is a longitudinal section of a receiver tube in which the viewing screen is combined with the face plate or window and has a color filter contained therein in accord with a preferred form of my invention;

Figure 1:
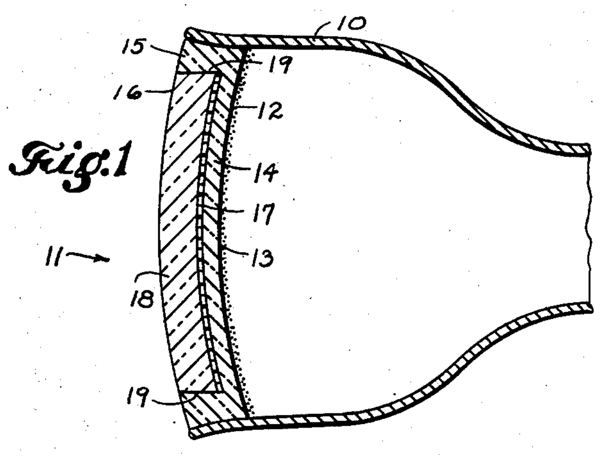

Having reference now to the details of the drawing, I have shown a television receiver tube in which the conventional envelope 10 is closed by a transparent face plate indicated generally at 11. The seal between the envelope 10 and the face plate 11 may be effected in any of the well-known ways, it being noted that the face plate is of considerable thickness in accord with the manufacturing tendency hereinbefore noted. The face plate 11 also serves, in the embodiment shown in Figures 1 and 2, as a viewing screen, having on its interior face a coating 12 of material such as one of the phosphors commonly used for the purpose, which becomes luminescent under electronic excitation. Within the envelope 10 are controls (not shown) for directing and moving an electronic beam in a linear pattern upon the coating 12 to form a scanning raster producing a video image, and as is well known in the art such controls may be arranged to form rasters precisely and predeterminedly located upon the coating 12.

As above generally described, the receiving tube is conventional. The improvement in which my invention is preferably embodied consists in dividing the combined face-plate and viewing screen 11 on a plane parallel to the coating 12 and placing between the so-divided portions a linear color filter having substantially the same number of lines, dimensions and arrangement as the raster to be formed on the coating 12, so that when the color filter and the controls governing the raster have been relatively adjusted each of the lines of the filter will coincide with one of the raster lines when viewed from the front of the tube. The plane of division of the combined face-plate and viewing screen is preferably as close as is practicable to the coating 12, so as to avoid parallax between the filter lines and the raster lines.

In Figure 1 I have shown the divided face-plate and viewing screen 11 as having an interior plate 13 having a thin central portion 14 surrounded by a flange 15 which extends towards the face of the tube and has sufficient width to provide a good seal with the envelope 10. Within the recess 16 formed by the flange 15 and central portion 14 is disposed a color filter 17, which may be colored film or a thin transparent plate. Also within the recess 16, and pressing the filter 17 against the plate 13, is an insert plate 18, which closely fits the recess and is secured, as by cementing, to the plate 13 beyond the margins of the filter 17. To prevent external air pressure from exerting too great force on the thin central portion 14, the insert plate 18 should be so cemented as shown at 19, that the recess 16 and the filter 17 therewithin are hermetically sealed. The coating 12 is placed on the face of the plate opposite to the filter 17 and coextensively with the filter—that is, upon the face of the thin central portion 14 which is inwardly of the envelope 10.

Figure 2:
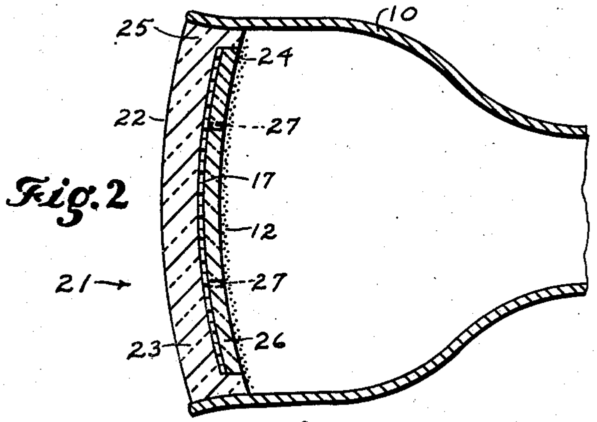
Fig. 2 is a similar sectional view, showing a modified manner of inserting the color filter in a combined viewing screen and face plate.

In the modified form of my invention shown in Figure 2, the divided face-plate and viewing screen 21 is formed with a flanged exterior plate 22, and the central portion 23 of the exterior plate is relatively thick, and the recess 24 bounded by the flange 25 is relatively shallow and is on the inner side of the plate 22. The recess 24 contains the filter 17 and an insert plate 26. The insert plate 26 is relatively thin, but receives support from the portion of the plate 22 adjacent thereto which constitutes the major part of the total thickness of the screen. It is not desirable in this form of my invention to seal the recess 24, as any weakness in such a seal might in time leak air from the recess into the exhausted tube, but the insert plate 26 should be firmly cemented in place and small vents 27 should be left communicating between the interior of the recess and the interior of the envelope 10 so that when the latter is subsequently exhausted any air remaining around the filter 17 will also be exhausted.

Figure 3:
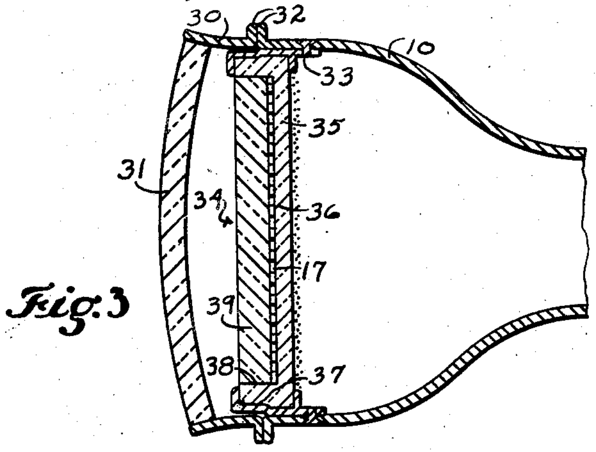
Fig. 3 is a sectional view of a type of receiver tube in which the viewing screen is separate from the face plate and the color filter is incorporated in the separate viewing screen.

In Figure 3 is illustrated a further modification in which the viewing screen is entirely enclosed within the envelope 10 and is not combined with a face-plate. The envelope 10 in such construction usually has an annular forward extension 30 to which a simple window face plate 31 is sealed, the extension 30 being welded to the envelope 10 at flanges 32. Mounted within the envelope 10 on a bracket 33 suitably secured to the envelope is a viewing screen 34, substantially like the viewing screen 11 in general construction. A plate 35 has a thin central portion 36 bounded by a flange 37 forming a recess 38 on that side of the plate 35 toward the window 31. The color filter 17 is disposed within the recess 38 against the portion 36 of the plate 35 and is held thereby an insert plate 39 secured, as by cementing, to the flange 36. The electronically excitable coating 12 is disposed on the face of the plate 35 opposite to the recess 38, being separated from the filter 17 by the thin central portion 36. As the division line between the flange 37 and the insert plate 39 is within the envelope 10 it is desirable that this division line be not sealed when the insert plate is cemented in place, but that venting to the interior of the recess 38 be provided.

Figure 4:
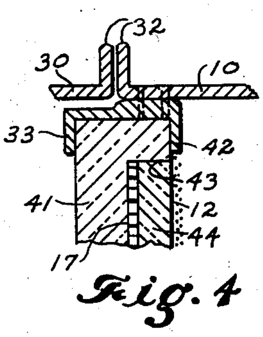
Fig. 4 is a fragmentary sectional view showing the modified arrangement of Figure 2 applied to the separate viewing screen of Figure 3.

In the further modification shown fragmentarily in Figure 4, the general construction of tube envelope and the position of the viewing screen is the same as shown in Figure 3, the construction of the viewing screen being, however, similar to that shown in Figure 2. The recessed plate 41 is disposed towards the face or window of the tube (not shown but toward the left of the figure) and has a relatively shallow flange 42 and recess 43. The insert plate 44 carries the coating 12 and holds the filter 17 within the recess 43. Again, it is desirable to provide venting for the recess 43 when the insert plate 44 is cemented in place.

Figure 5:
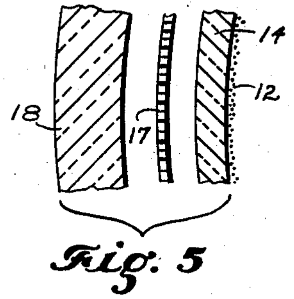
Fig. 5 is a fragmentary exploded view indicative of separable parts which may form the viewing screen of any of Figures 1, 2, 3, or 4.

As clearly shown in the fragmentary exploded view of Figure 5, a section through the central part of any of the viewing screens shown in Figures 1, 2, 3, and 4 is basically the same. The filter 17 is separated from the coating 12 by only a thin transparent plate portion 14 (or 26, 36, or 44), and the thin plate portion and filter are supported on the side away from the coating 12 by a thicker plate portion 18 (or 23, 39, or 41). Thus parallax between colored lines on the filter 17 and raster lines on the coating 12 may be reduced to a minimum, yet support is given to the thin plate portions, any tendency for the filter to warp or crawl under heat is adequately obviated, and a broad flange is provided for sealing the viewing screen and windows to the envelope 10 (Figures 1 and 2) and for conducting heat from the viewing screen to the envelope (all forms of the invention).

Figure 6:
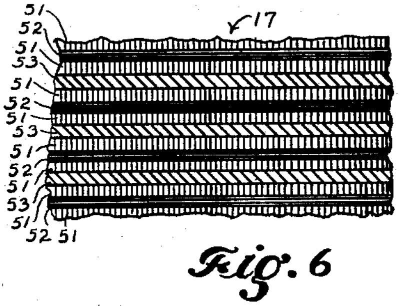
Fig. 6 is an enlarged fragmentary elevational view of a color filter, showing a preferred color arrangement.

A preferred linear arrangement of the filter 17 is shown in Figure 6. The colored lines 51, 52, and 53 will be of the same magnitude as the raster lines of the particular receiving tube with which the filter is used. For the reasons disclosed in my hereinbefore mentioned co-pending Application 251,274, I prefer, when the filter 17 is to be used with a receiving tube of the present standards of two-field interlace, to arrange the colored lines so that lines 51 corresponding to and in optical alignment with the raster lines of one field shall be of one color (as illustrated for example, red) and that lines 52 and 53 corresponding to and in optical alignment with the raster lines of the other field shall be alternately of the two other primary light-addition colors (for example, blue and green).

Further modifications of my invention being possible within the scope of the principles herein disclosed, I do not wish be limited to the examples specifically shown and described, but claim my invention to the full breadth and scope of the appended claims.

I claim:

1. In a television receiving tube, a viewing screen comprising: a pair of transparent plates, one of said plates having a flange for securing said plate to the envelope of said tube, said flange forming a central recess, the other of said plates fitting within said recess and being marginally secured to said one plate, a color filter held between said plates and having a plurality of colored lines parallel to the lines forming the scanning raster of said tube and substantially equal in number and dimension to said raster lines whereby each of said colored lines may coincide with one of said raster lines, and a coating of a electronically luminescent material on that plate face receptive of said raster.

2. In a television receiving tube, a viewing screen having the construction set forth in claim 1, in which the thickness of said screen between said filter and said coating is a lesser portion of the total thickness of said screen.

3. In a television receiving tube, a viewing screen having the construction set forth in claim 1, in which the portion of said screen intervening between said filter and said coating is relatively thin, said thin portion receiving support from that one of said plates adjacent thereto.

4. In a television receiving tube, a viewing screen having the construction set forth in claim 1, in which said filter is hermetically sealed between said plates.

5. A viewing screen for television comprising: a transparent plate; material responsive to electronic excitation to form a video image disposed on one face of said plate; a thin color filter disposed on the opposite face of said plate; and a second transparent plate holding said filter against first plate; one of said plates having a flange forming a recess in which the other of said plates and said filter are disposed, said plates being secured to each other to hold said filter within said recess.

6. In a television receiving tube, a face plate comprising: a transparent window member having a thin central portion and a flange surrounding said central portion and adapted to be secured to the envelope of said tube; a transparent insert substantially filling the recess formed by said flange; material responsive to electronic excitation to form a video image disposed on one face of said face plate, whereby said face plate serves as a viewing screen for said tube; and a color filter disposed between said insert and said thin central portion.

7. In a television receiving tube: a face plate having the construction set forth in claim 6, in which said color filter is a thin sheet of transparent material bearing a plurality of parallel colored lines.

8. In a television receiving tube: a face plate having the construction set forth in claim 6, in which said color filter is hermetically sealed between said face plate and said insert.

9. In a television receiving tube: a face plate having the construction set forth in claim 6, in which said insert is on the side of said face plate inwardly of said tube and said recess is vented to the interior of said tube.

10. In a television receiving tube: a viewing screen comprising a transparent plate having a thin central portion and a flange surrounding said central portion and forming therewith a recess; bracket means secured to the envelope of said tube and engaging said flange for holding said plate transversely of said tube; a transparent insert disposed within said recess and secured to said plate so as to permit said recess to be vented to the interior of said tube; material responsive to electronic excitation to form a video image, disposed on one face of said viewing screen; and a color filter disposed in said recess between said insert and said plate.

KARL ROBERT HOYT.

REFERENCES CITED

The following references are of record in the file of this patent:

UNITED STATES PATENTS

| Number | Name | Date |
|---|---|---|
| 2,532,511 | Okolicsanyi | Dec. 5, 1950 |
| 2,543,477 | Sziklai et al. | Feb. 27, 1951 |